US012769877B2

(12) United States Patent
Wang et al.

(10) Patent No.: US 12,769,877 B2
(45) Date of Patent: Oct. 20, 2026

(54) PROTECTING SENSITIVE DATA DURING CONFIDENTIAL COMPUTING DEBUGGING

(71) Applicant: INTERNATIONAL BUSINESS MACHINES CORPORATION, Armonk, NY (US)

(72) Inventors: Heng Wang, Beijing (CN); Yu Zui You, Ningbo (CN); Xiao Ling Chen, Beijing (CN); Zhan Peng Huo, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 19/042,807

(22) Filed: Jan. 31, 2025

(65) Prior Publication Data

US 2026/0228357 A1 Aug. 6, 2026

(51) Int. Cl.
*G06F 21/62* (2013.01)
*G06F 21/12* (2013.01)

(52) U.S. Cl.
CPC .......... *G06F 21/6245* (2013.01); *G06F 21/12* (2013.01); *G06F 2221/2141* (2013.01)

(58) Field of Classification Search
CPC ................. G06F 21/6245; G06F 21/12; G06F 2221/2141
See application file for complete search history.

(56) References Cited

U.S. PATENT DOCUMENTS

| | | | |
|---|---|---|---|
| 10,846,199 B2 | 11/2020 | Mola et al. | |
| 11,288,170 B1 | 3/2022 | Chen et al. | |
| 11,822,641 B2 | 11/2023 | Tsirkin et al. | |
| 2014/0344784 A1* | 11/2014 | Bates | G06F 11/362 717/124 |
| 2019/0213101 A1 | 7/2019 | Raviv et al. | |

(Continued)

FOREIGN PATENT DOCUMENTS

| | | |
|---|---|---|
| CN | 115357447 A | 11/2022 |
| WO | 2024/000565 A1 | 1/2024 |

OTHER PUBLICATIONS

Miodrag Petkovic et al., "A Host Based Method for Data Leak Protection by Tracking Sensitive Data Flow", May 7, 2012. (Year: 2012).*

(Continued)

*Primary Examiner* — J. Brant Murphy
*Assistant Examiner* — Christopher Lam
(74) *Attorney, Agent, or Firm* — Seed Intellectual Property Law Group LLP

(57) ABSTRACT

A method, system, and computer program product configured to perform operations including: identifying sensitive variables marked with a confidential computing sensitive tag within a compiled microservice code; identifying unmarked variables related to the sensitive variables within the compiled microservice code; tagging the unmarked variables related to the sensitive variables with a sensitive attribute; generating debugging information entries comprising the sensitive variables and the sensitive attribute tag of the tagged unmarked variables; generating a protect flag in a debugging reply packet based on the debugging information entries; and denying data access to downstream debugger clients based on the protect flag.

20 Claims, 6 Drawing Sheets

(56) References Cited

U.S. PATENT DOCUMENTS

| | | | | |
|---|---|---|---|---|
| 2019/0213355 | A1* | 7/2019 | Raviv | G06F 11/0706 |
| 2020/0019719 | A1 | 1/2020 | Mola et al. | |
| 2020/0042729 | A1* | 2/2020 | Feng | G06F 11/0706 |
| 2020/0065182 | A1* | 2/2020 | Mattila | G06F 11/0793 |
| 2022/0222337 | A1 | 7/2022 | Doshi et al. | |
| 2023/0134277 | A1 | 5/2023 | K et al. | |
| 2023/0195597 | A1* | 6/2023 | Guzman | G06F 11/0793 717/124 |
| 2023/0297696 | A1 | 9/2023 | Rogers et al. | |
| 2024/0078336 | A1* | 3/2024 | Sansom | G06F 8/77 |
| 2024/0160530 | A1 | 5/2024 | Das et al. | |
| 2024/0223543 | A1 | 7/2024 | Miedema | |
| 2024/0275610 | A1 | 8/2024 | Abboud et al. | |

OTHER PUBLICATIONS

International Searching Authority, "Notification of Transmittal of the International Search Report and the Written Opinion of the International Searching Authority, or Declaration," Patent Cooperation Treaty Mar. 10, 2026, 14 pages, International Application No. PCT/EP2026/050300.

Wang, et al., "Prevention of Information Leakage", U.S. Appl. No. 18/962,116, Filed Nov. 27, 2024, 32 Pages.

Author unknown, "Debugging Intel Software Guard Extensions (Intel SGX) Enclaves in Microsoft Windows," White Paper Intel SGX, 2017, pp. 1-11, intel.com, accessed May 8, 2024, https://www.intel.com/content/dam/develop/external/us/en/documents/debuggi ng-intel-sgx-encl aves-in-windows-737361. pdf.

Author unknown, "Google Cloud TEE Solution," Google Confidential Computing, 2024, 3 pages, accessed May 8, 2024, https://cloud.google.com/confidential-computing/confidential-vm/docs/confidential-vm-overview.

Author unknown, "IBM Cloud TEE Solution," Confidential computing with IBM, 2024, 9 pages, ibm.com, accessed May 7, 2024, https://www.ibm.com/confidential-computing.

Author unknown, "IBM Secure Execution for Linux," IBM Systems, 2024, 4 pages, ibm.com, accessed May 7, 2024, https://www.ibm.com/down loads/cas/O158MBWG?mhsrc=ibmsearch_a&m hq=Secure%20execution%20for%20Linux.

Author unknown, "Microsoft Azure TEE Solution," Microsoft Build, Apr. 2024, 5 pages, accessed May 7, 2024, https://learn.microsoft. com/en-us/azure/confidential-computing/.

Author unknown, "SGX Enclave Debugger," Intel White Paper, 2018, pp. 1-13, intel.com, accessed May 8, 2024, https://www.intel.com/content/www/us/en/content-details/671101/debuggi ng-intel-software-guard-extensions-intel-sgx-enclaves-for-linux-operati ng-system. html.

IBM. "What is confidential computing?", retrieved from web https://www.ibm.com/think/topics/confidential-computing, Jun. 4, 2024, 9 pages.

* cited by examiner

PROTECTING SENSITIVE DATA DURING CONFIDENTIAL COMPUTING DEBUGGING

BACKGROUND

Aspects of the present invention relate generally to securing sensitive and confidential information during a debugging process for microservice source code.

Confidential computing is a security and privacy-enhancing computational technique which protects data. In particular, confidential computing is used in conjunction with storage and network encryption to protect stored data and data in transit.

SUMMARY

In a first aspect of the invention, there is a method including: identifying, by the processor set, sensitive variables marked with a confidential computing sensitive tag within a compiled microservice code; identifying, by the processor set, unmarked variables related to the sensitive variables within the compiled microservice code; tagging, by the processor set, the unmarked variables related to the sensitive variables with a sensitive attribute; generating, by the processor set, debugging information entries comprising the sensitive variables and the sensitive attribute tag of the tagged unmarked; generating, by the processor set, a protect flag in a debugging reply packet based on the debugging information entries; and denying, by the processor set, data access to downstream debugger clients based on the protect flag.

In another aspect of the invention, there is a computer program product comprising one or more computer-readable storage media and program instructions stored on the one or more computer-readable storage media to perform operations comprising: identifying, by the processor set, sensitive variables marked with a confidential computing sensitive tag within a compiled microservice code; identifying, by the processor set, unmarked variables related to the sensitive variables within the compiled microservice code; tagging, by the processor set, the unmarked variables related to the sensitive variables with a sensitive attribute; generating, by the processor set, debugging information entries comprising the sensitive variables and the sensitive attribute tag of the tagged unmarked; generating, by the processor set, a protect flag in a debugging reply packet based on the debugging information entries; and denying, by the processor set, data access to downstream debugger clients based on the protect flag.

In another aspect of the invention, there is a computer system comprising a processor set, one or more computer-readable storage media, and program instructions stored on the one or more computer-readable storage media to cause the processor set to perform operations comprising: identifying, by the processor set, sensitive variables marked with a confidential computing sensitive tag within a compiled microservice code; identifying, by the processor set, unmarked variables related to the sensitive variables within the compiled microservice code; tagging, by the processor set, the unmarked variables related to the sensitive variables with a sensitive attribute; generating, by the processor set, debugging information entries comprising the sensitive variables and the sensitive attribute tag of the tagged unmarked; generating, by the processor set, a protect flag in a debugging reply packet based on the debugging information entries; and denying, by the processor set, data access to downstream debugger clients based on the protect flag.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
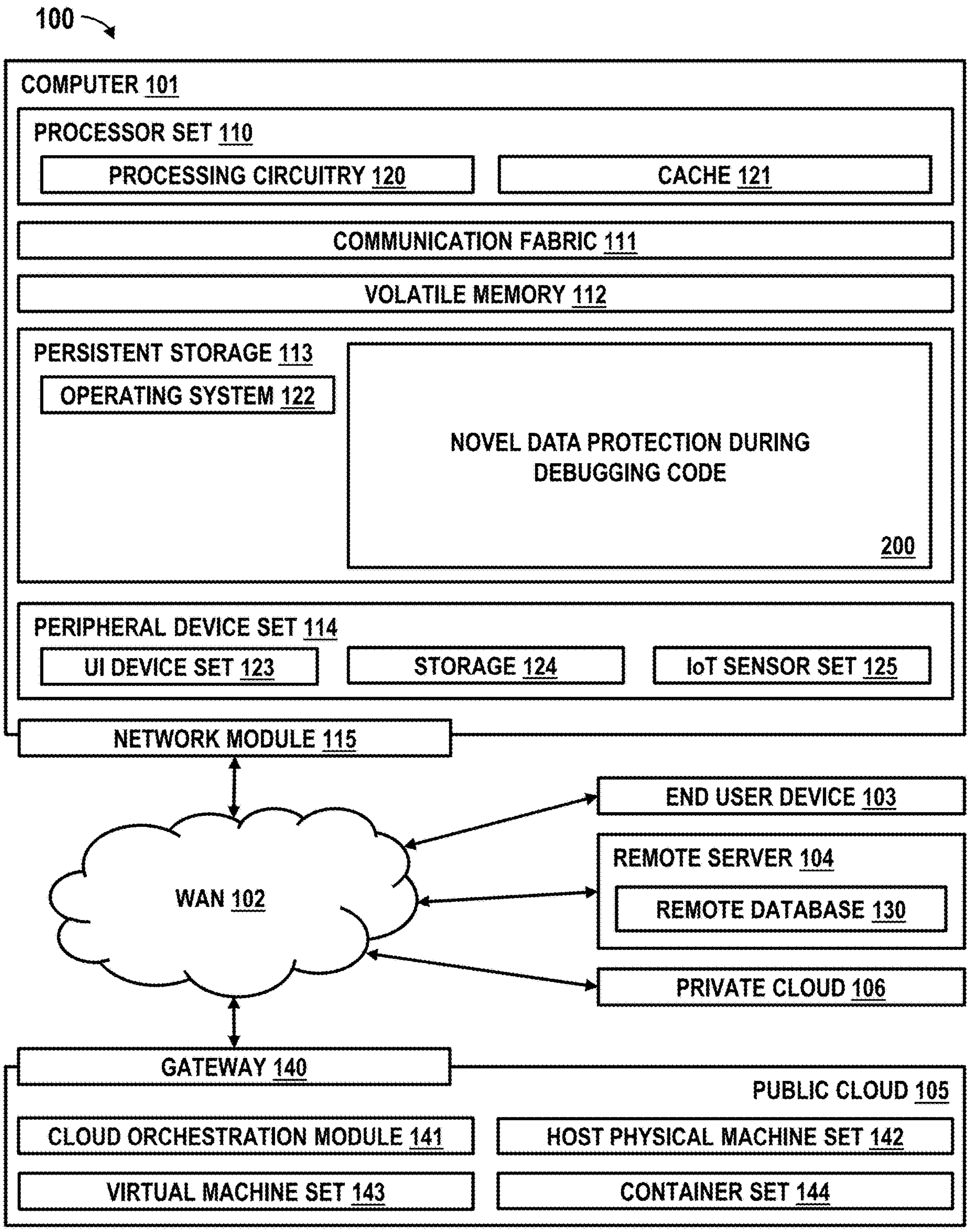
FIG. 1 depicts a computing environment according to an embodiment of the present invention.

Aspects of the present invention relate generally to securing sensitive and confidential information during a debugging process and, more particularly, to analyzing compiled microservice code to identify variables and portions of the microservice code that should be protected from unauthorized access.

According to an aspect of the present invention, the method, system, and computer program product includes: analyzing variables marked with sensitive keywords; traversing a data flow graph and identifying related variables, where the related variables are not explicitly marked as being sensitive but are associated with the variables marked with the sensitive keywords.

In embodiments, the computer-implemented method, system, and computer program product further embeds a sensitivity attribute into a debugging information entry during a generation of debugging information. In embodiments, the sensitivity attribute is embedded into a debugging with attributed record formats (DWARF) section of an executable file.

Many industries are bound by strict regulatory requirements regarding data privacy and security. In conventional microservice architectures, sensitive customer data, such as personal identifiers, payment information, medical records, or any other sensitive data, is often stored and processed across various services. During conventional debugging procedures, developers and operators may access detailed logs, error messages, or trace information to diagnose issues within the source code. For example, when a conventional microservice encounters an error, detailed logs may contain stack traces, variable values, and even parts of the request payload, which could inadvertently include sensitive information. Conventional systems do not adequately sanitize or redact the sensitive data before being shared with debugging teams. As a result, sensitive customer data could be exposed, potentially leading to data breaches or violating privacy regulations. Therefore, companies have difficulty adhering to strict regulatory requirements such as General Data Protection Regulation (GDPR), the Health Insurance Portability and Accountability Act (HIPAA), etc., because some data may be leaked during a debugging process. In other industries trade secrets and other important intellectual property may be leaked through these unreliable and unsecure processes.

Embodiments and aspects of the present invention provide systems and methods that improve and advance the technology in a practical application. In other words, the methods, systems, and computer program products described herein improve data privacy during debugging operations. The present invention introduces a method for safeguarding sensitive variable references and operations during the debugging of microservices in cloud confidential computing environments. In embodiments, the instant invention involves the creation of a sensitive variable data flow graph inference (SVDFGI) module, which may analyze and identify variables marked with predefined sensitive keywords. In embodiments, the present invention further identifies variables related to the predefined sensitive variables. In such embodiments, the present inventions marks the related variables as classified and/or sensitive. Furthermore, in embodiments, the present invention incorporates the identified related variables into the debugging information entries, thereby ensuring that the sensitive classification of these related variables is preserved throughout the debugging process by preventing unauthorized access to the classified and/or sensitive data.

Implementations of the invention are necessarily rooted in computer technology. For example, the steps of identifying unmarked variables related to the sensitive variables within the compiled microservice code; tagging the unmarked variables related to the sensitive variables with a sensitive attribute, generating debugging information entries comprising the sensitive variables and the sensitive attribute tag of the tagged unmarked variables; generating a protect flag in a debugging reply packet based on the debugging information entries; and denying data access to downstream debugger clients based on the protect flag are computer-based and cannot be performed in the human mind. Given this scale and complexity of the foregoing operations, it is simply not possible for the human mind, or for a person using pen and paper, to perform the number of calculations involved in performing those steps.

It should be understood that, to the extent implementations of the invention collect, store, or employ personal information provided by, or obtained from, individuals (for example, personal and/or sensitive data that is sought to be obfuscated by the instant invention), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as the novel data protection during debugging code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as “images.” A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word “microservices” shall be interpreted as inclusive of larger “services” regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider’s systems, and back. In some embodiments, cloud services may be configured and orchestrated according to as “as a service” technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Figure 2:
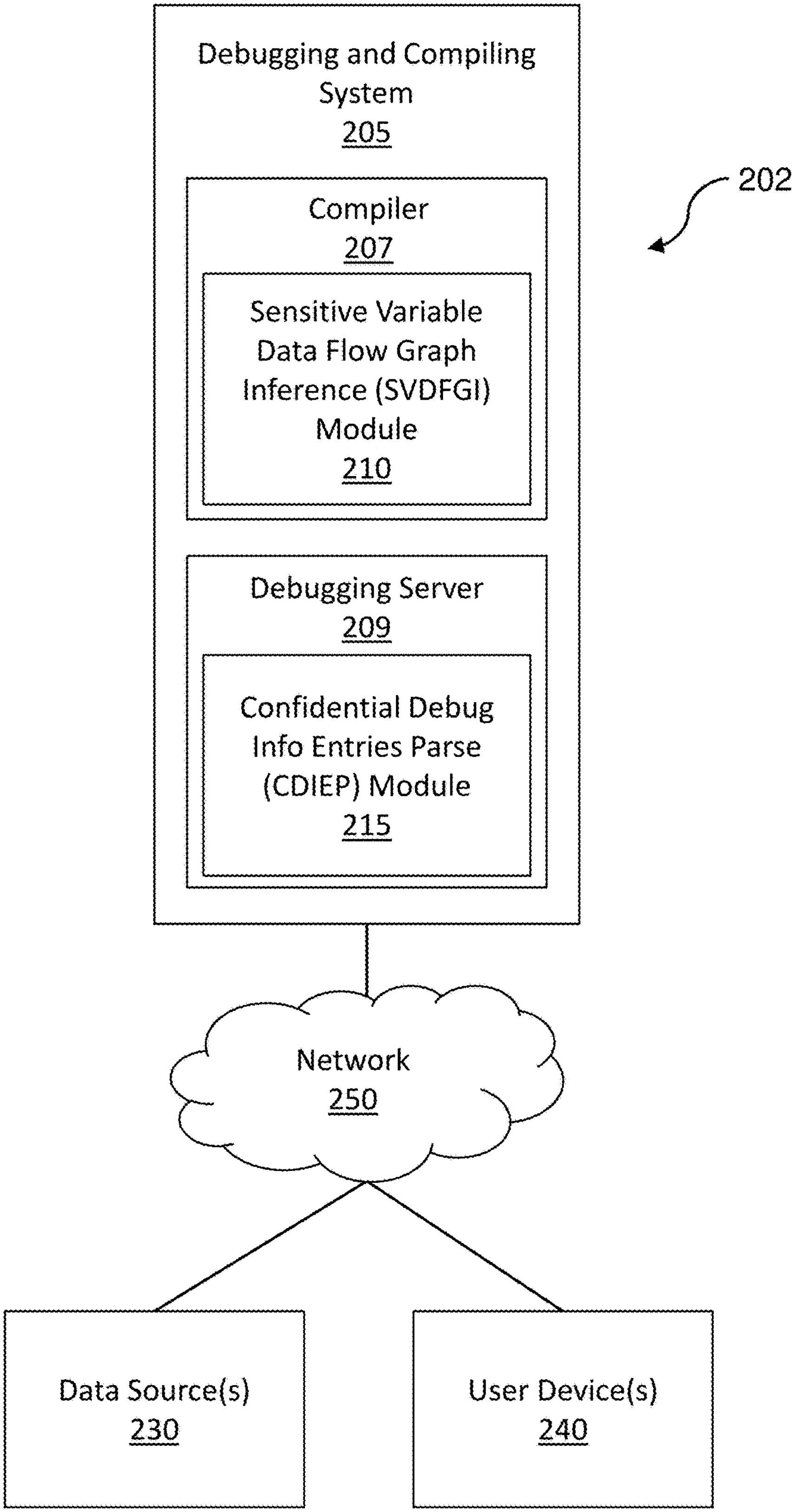
FIG. 2 shows a block diagram of an exemplary environment in accordance with aspects of the present invention.

FIG. 2 shows a block diagram of exemplary environment 202 in accordance with aspects of the present invention. In embodiments, environment 202 includes debugging and compiling system 205, data source(s) 230, user device(s) 240, and network 250.

Debugging and compiling system 205 may comprise one or more instances of computer 101 of FIG. 1. In another example, debugging and compiling system 205 may comprise one or more virtual machines or containers running on one or more instances of computer 101 of FIG. 1. In embodiments, debugging and compiling system 205 communicates with data source(s) 230 and user device(s) 240 via network 250, which may comprise WAN 102 of FIG. 1. In embodiments, data source(s) 230 may comprise one or more data sources each comprising an instance of remote database 130 and/or remote server 104 of FIG. 1. In embodiments, user device(s) 240 comprises an instance of end user device 103 of FIG. 1. There may be plural different instances of user device(s) 240 including, for example, personal computing devices and/or any other device useful for debugging source code, as disclosed herein. The different instances of user device(s) 240 may be used by different users, evaluators, operators, technicians, programmers, etc.

In embodiments, debugging and compiling system 205 of FIG. 2 comprises compiler 207, which includes sensitive variable data flow graph Inference (SVDFGI) module 210, and debugging server 209, which includes confidential debug info entries parse (CDIEP) module 215, each of which may comprise modules of the code of block 200 of FIG. 1. Such modules may include routines, programs, objects, components, logic, data structures, and so on that perform a particular task (or tasks) or implement a particular data type (or types) that the code of block 200 uses to carry out the functions and/or methodologies of embodiments of the present invention as described herein. These modules of the code of block 200 are executable by computer 101 of FIG. 1 (e.g., processing circuitry 120 of FIG. 1) to perform the inventive methods as described herein. Debugging and compiling system 205, compiler 207, and/or debugging server 209 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the present invention, debugging and compiling system 205 is configured to facilitate communication between compiler 207 (e.g., SVDGFI module 210), debugging server 215 (e.g., CDIEP module 215), and external storage (e.g., data source(s) 230) and devices (e.g., user device(s) 240) via network 250. In embodiments, compiler 207 is configured to compile a microservice code. In embodiments, debugging and compiling system 205 includes one or more additional compilers. In additional embodiments, debugging and compiling system 205 is configured to receive, access, and/or obtain a compiled microservice code from a local compiler (e.g., compiler 207), an external storage (e.g., data source(s) 230), and/or devices (e.g., user device(s) 240). As used herein, microservice code refers to the source code that is developed for individual, self-contained services in a microservices architecture. In embodiments, microservices focus on a specific business function, communicate with other services, and are independently deployable, scalable, and maintainable. In embodiments, debugging and compiling system 205 may be configured to deny data access to sensitive data within the compiled microservice code to downstream debugger clients.

In accordance with aspects of the present invention, SVDGFI module 210 of compiler 207 is configured to generate a data flow graph comprising a flow of data between variables and operations based on the microservice code. As used herein, a data flow graph refers to a directed graph where nodes represent variables, operations, or computations, and edges denote the flow of data between them. In embodiments, the data flow graph captures the relationships and dependencies between variables and operations. In such embodiments, the data flow graph enables an analysis of data propagation, particularly for identifying and classifying sensitive variables within the microservice code.

In embodiments, SVDGFI module 210 is configured to identify sensitive variables marked with a confidential computing sensitive tag within the microservice code and/or data flow graph. In embodiments, the confidential computing sensitive tag refers to a special attribute and/or marker that may be applied to variables to indicate their sensitivity. This confidential computing sensitive tag serves as an identifier for variables that store and/or process sensitive data. In such embodiments, by tagging the confidential computing sensitive data, the SVDGFI module 210 ensures that the sensitive data is treated with additional security precautions during debugging, analysis, and execution within the microservice code.

In embodiments, SVDGFI module 210 is configured to identify unmarked variables related to the sensitive variables within the microservice code and/or data flow graph. In other words, some variables that are not marked with a confidential computing sensitive tag may be related to other variables (e.g., other variables that are used and/or defined within the microservice code) that are marked with a confidential computing sensitive tag. For example, in an exemplary scenario, a variable s is marked as being confidential computing sensitive, a variable p is not marked as being confidential computing sensitive, and p is equal to s+5 (i.e., p's declaration statement is s+5). In such an embodiment, a programmer may learn the value of p because p is not marked as being confidential computing sensitive. If the programmer knows the value of p, the programmer will also know the value of s because s would be p−5 (i.e., s's declaration statement is p−5). Further, if variable y relies on a value of p, the value of s may be derived from y through p, so the variable y could also become known. Therefore, SVDGFI module 210 identifies and tags the unmarked variables related to the sensitive variables (e.g., variables p and y) within the microservice code and/or data flow graph so they can be appropriately marked and/or tagged as being confidential computing sensitive. In embodiments, SVDGFI module 210 is configured to tag the unmarked variables (e.g., variables p and y) with a sensitive attribute (e.g., a confidential computing sensitive tag). In other words, in embodiments, SVDGFI module 210 may determine that a declaration statement of the unmarked variable includes a sensitive variable and that it should be considered and/or treated as sensitive. In such instances, SVDGFI module 210 tags and/or marks the unmarked variable with a sensitive attribute (e.g., a confidential computing sensitive tag). As used herein, a declaration statement refers to a line of code where a variable is defined and/or initialized, specifying its type and, in some cases, an initial value of the variable.

In accordance with aspects of the present invention, CDIEP module 215 of debugging server 215 is configured to generate debugging information entries comprising the sensitive variables and the unmarked variables (e.g., variables p and y) related to the sensitive variables. As used herein, debugging information entries refer to data structures (e.g., organized collections of data elements that are stored and managed in a specific format for efficient access, manipulation, and retrieval) embedded within the debugging information of an executable file that describe various aspects of the program, such as variables, functions, and source code locations. In embodiments, the debugging information entries are part of a debugging with attributed record formats (DWARF) format. In embodiments, the debugging information entries may include attributes that identify the properties and relationships of program elements. In embodiments, the debugging information entries may include sensitive and/or confidential attributes (e.g., confidential computing sensitive attributes?) to ensure the appropriate handling of sensitive and related variables during the debugging process.

In embodiments, CDIEP module 215 generates a protect flag in a debugging reply packet based on the debugging information entries. As used herein, a protect flag refers to a binary indicator or marker used to indicate whether certain variables or data should be treated as sensitive and/or require protection during debugging. When set, the protect flag indicates that sensitive variables, as well as unmarked variables related to sensitive data, are to be safeguarded from unauthorized access, leakage, and/or exposure in the debugging process. In other words, when CDIEP module 215 determines that a variable has a protect flag, that variable is safeguarded from unauthorized access. In embodiments, the protect flag helps to enforce security policies by preventing the debugging system from revealing and/or modifying these sensitive variables. In embodiments, the system may allow data access to downstream debugger clients based on an absence of a protect flag.

Figure 3:
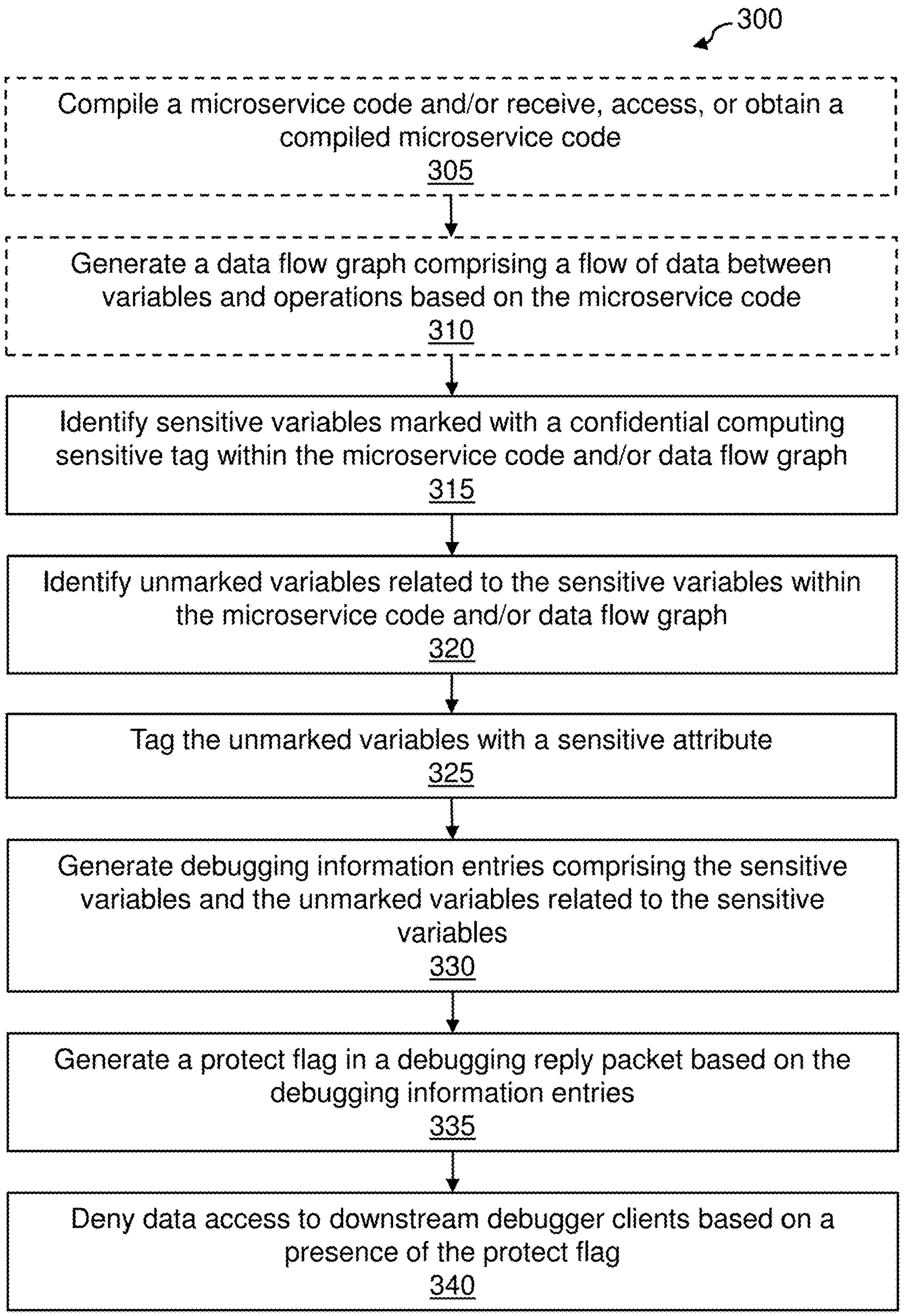
FIG. 3 shows a flowchart of an exemplary method in accordance with aspects of the present invention.

FIG. 3 shows a flowchart of an exemplary method in accordance with aspects of the present invention. Steps of the method (also referred to as operations) may be carried out in the environment of FIG. 2 and are described with reference to elements depicted in FIG. 2.

At operation 305, compiler 207 of FIG. 2 may be optionally configured (as indicated by the dotted line) to compile a microservice code and/or receive, access, or obtain a compiled microservice code. In other words, debugging and compiling system 205 has the functionality to either compile microservice source code into executable code (e.g., using compiler 207) or handle precompiled code that is already available for debugging. In embodiments, and as provided above, debugging and compiling system 205 may be configured to receive, access, and/or obtain a compiled microservice code from a local compiler (e.g., compiler 207), an external storage (e.g., data source(s) 230), and/or devices (e.g., user device(s) 240).

At operation 310, SVDGFI module 210 of FIG. 2 may be optionally configured to generate a data flow graph comprising a flow of data between variables and operations based on the microservice code. In other words, SVDGFI module 210 may generate a data flow graph that captures relationships and dependencies between variables and operations.

At operation 315, SVDGFI module 210 may be configured to identify and/or tag sensitive variables marked with a confidential computing sensitive tag within the microservice code and/or data flow graph. As noted above, some variables may already be assigned and/or tagged with a confidential computing sensitive tag. At this operation, SVDGFI module 210 systematically analyzes the microservice code and data flow graph to locate and confirm the variables that are explicitly marked as sensitive (e.g., with a confidential computing sensitive tag).

At operation 320, SVDGFI module 210 may be configured to identify unmarked variables related to the sensitive variables within the microservice code and/or data flow graph. As noted above, unmarked variables related to the sensitive variables include any variable that might provide some and/or any information about variables that are explicitly marked with a confidential computing sensitive tag. SVDGFI module 210 performs this by traversing the data flow graph to detect any dependencies or relationships between unmarked variables and those marked as sensitive. In embodiments, this analysis includes identifying variables that are derived from and/or computed using sensitive variables. In such embodiments, SVDGFI module 210 ensures that these unmarked variables are identified for further classification.

At operation 325, SVDGFI module 210 is configured to tag the unmarked variables with a sensitive attribute (e.g., a confidential computing sensitive tag). In embodiments, the unmarked variables are tagged by associating the sensitive attribute with each identified unmarked variable based on their relationship to explicitly marked sensitive variables. In embodiments, the tagging process is performed automatically by SVDGFI module 210, to ensure that all related variables are properly classified as sensitive and receive the appropriate protection during debugging.

At operation 330, CDIEP module 215 of FIG. 2 may be configured to generate debugging information entries comprising the sensitive variables and the unmarked variables related to the sensitive variables. As noted above, debugging information entries refer to data structures embedded within the debugging information of an executable file that describe various aspects of the program, such as variables, functions, and source code locations. In embodiments, the debugging information entries are part of a debugging with attributed record formats (DWARF) format. In embodiments, the debugging information entries may include attributes that identify the properties and relationships of program elements. In embodiments, these debugging information entries may include sensitive and/or confidential attributes (e.g., confidential computing sensitive) to ensure the appropriate handling of sensitive and related variables during the debugging process.

At operation 335, CDIEP module 215 is configured to generate a protect flag in a debugging reply packet based on the debugging information entries. As noted above, a protect flag refers to a binary indicator or marker used to indicate whether certain variables or data should be treated as sensitive and/or require protection during debugging. When set, the protect flag indicates that sensitive variables, as well as unmarked variables related to sensitive data, are to be safeguarded from unauthorized access, leakage, and/or exposure in the debugging process. In embodiments, the protect flag helps to enforce security policies by preventing the debugging system from revealing and/or modifying these sensitive variables. In embodiments, variables that do not have a protect flag are visible and/or accessible without restriction. In other words, in such embodiments, the system may allow data access to downstream debugger clients based on an absence of a protect flag.

At operation 340, debugging and compiling system 205 may be configured to deny data access to downstream debugger clients based on a presence of the protect flag. In other words, if the protect flag is set, the debugging and compiling system 205 prevents any downstream debugger clients from accessing and/or modifying sensitive variables or data that are marked for protection (e.g., marked as being confidential computing sensitive). In embodiments, debugging and compiling system 205 ensures that sensitive information is not exposed during the debugging process, thereby maintaining the confidentiality and security of the data by restricting access to only authorized users or processes.

Figure 4:
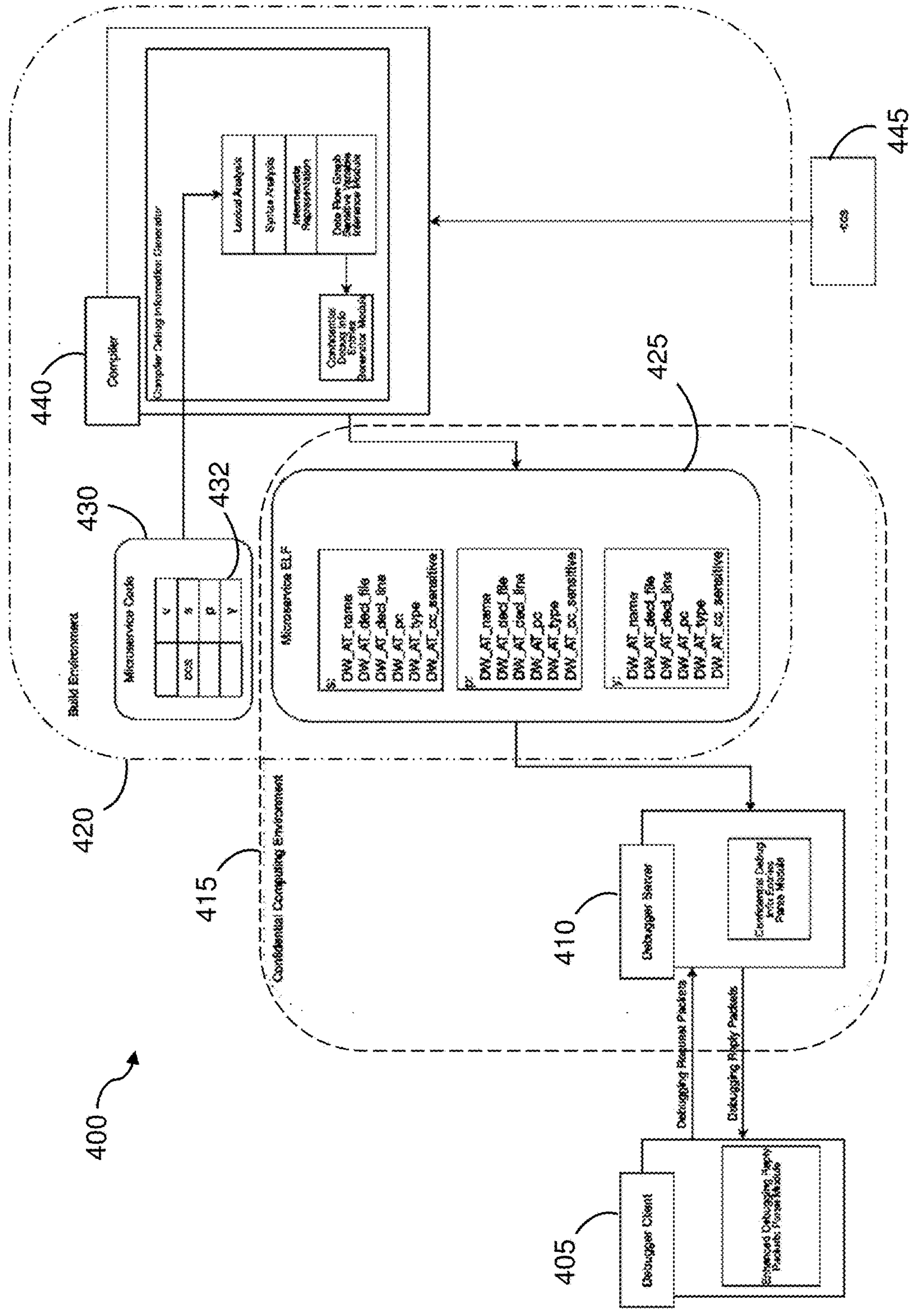
FIG. 4 shows a flowchart of an exemplary method in accordance with aspects of the present invention.

FIG. 4 shows a flow diagram of an exemplary method 400 in accordance with aspects of the present invention. Operations of the method 400 are described with reference to elements and actions depicted in and described with reference to FIGS. 2 and 3.

In embodiments, compiler 440 (e.g., one or more instances of compiler 207 of FIG. 2) of build environment 420 (e.g., one or more instances of debugging and compiling system 205 of FIG. 2) receives data from confidential computing services (CCS) 445 located outside build environment 420 and from microservice code 430 located within build environment 420. In embodiments, build environment 420 may comprise one or more instances of debugging and compiling system 205 of FIG. 2. In embodiments, data received from CCS 445 may include, for example, protected execution data, sensitive variable information, access control policies, or confidentiality settings related to the microservice code being debugged. In embodiments, this data is securely provided by CCS 445 to ensure that debugging operations are conducted in a protected and privacy-preserving manner. In embodiments, the data from microservice code 430 may include, for example, variables marked with a confidential computing sensitive tag and variables that are not marked with a confidential computing sensitive tag. For example, in table 432 of FIG. 4, variable s is marked with a confidential computing sensitive (e.g., ccs) tag while variables v, p, and y are not marked with a confidential computing sensitive tag.

In embodiments, compiler 440 may comprise a compiler debugging information generator that may perform lexical analysis, perform syntax analysis, generate an intermediate representation, and generate a data flow graph using a data flow graph sensitive variable inference module (e.g., one or more instances of SVDGFI module 210 of FIG. 2). As used herein, a lexical analysis refers to a process of breaking down the source code into basic components, such as keywords, identifiers, operators, and symbols, which may be referred to as tokens. In embodiments, the lexical analysis may provide information and understanding about the structure and meaning of the code before further processing. Syntax analysis refers to a process of analyzing the structure of the source code to ensure that it adheres to the grammatical rules or syntax of the programming language. For example, in embodiments, compiler 440 confirms whether tokens identified during the lexical analysis are arranged in a valid way according to language syntax rules, such as correct expression formation, function calls, and control structures. Generating an intermediate representation refers to a process of transforming the source code into a more abstract, lower-level form that is easier to analyze and optimize but still retains the logical structure of the original code. Generating a data flow graph using a data flow graph sensitive variable inference module may be conducted, for example, in accordance with operation 310 of FIG. 3.

In embodiments, compiler 440 further includes a confidential debug info entries generator module (e.g. one or more instances of CDIEP module 215 of FIG. 2). In embodiments, the confidential debug info entries generator module may generate debugging information entries comprising the sensitive variables and the unmarked variables related to the sensitive variables, in accordance with operation 330 of FIG. 3. In embodiments, the confidential debug info entries generator module outputs a result of generating debugging information entries, as depicted in microservice executable and linkable format (ELF) file 425. As used herein, a microservice ELF file 425 refers to a file that contains the compiled binary code of a microservice. In embodiments, the ELF formatted files may be used for executable files, object code, shared libraries, and other operations. ELF file 425 shows variables p and y now having confidential computing sensitive attributes (e.g., DW_AT_cc_sensitive) after processing performed by compiler 440. In embodiments, compiler 440 may further generate a protect flag based on the debugging information entries in accordance with operation 335 of FIG. 3.

The ELF file 425 is prepared for distribution via the confidential debug info entries parse module of debugger server 410 (e.g., one or more instances of debugging server 215 of FIG. 2). In embodiments, preparing ELF file 425 for distribution involves ensuring that both the compiled code and any sensitive debugging data are ready to be securely shared while respecting confidentiality rules. In embodiments, preparing ELF file 425 for distribution may further involve correcting any issues and/or errors detected while ensuring that both the compiled code and any sensitive debugging data are ready to be securely shared. In embodiments, the confidential debug info entries parse module of debugger server 410 may detect the protect flag(s) and deny access to the confidential computing sensitive information in response to the detection of the protect flag(s).

In embodiments, debugger client 405 (e.g., one or more instances of user device(s) 240 of FIG. 2) sends debugging request packets to debugger server 410 located at confidential computing environment 415 (e.g., one or more instances of debugging and compiling system 205). As used herein, a debugger client 405 refers to a client device or one software application(s) that initiates the debugging process by sending requests for debugging information to a debugger server. In other words, debugger client 405 requests debugging data packets from debugger server 410. In embodiments, debugger client 405 requests debugging data packets in response to a user (e.g., a programmer) input. In additional embodiments, debugger client 405 may automatically request debugging data as part of an automated programming process. In response to the request, debugger server 410 provides the non-confidential computing sensitive information to debugger client 405 using debugger reply packets. In embodiments, a debugging reply packet may include the protect flag generated at compiler 440, based on the debugging information entries in accordance with operation 335 of FIG. 3.

In embodiments, one or more instances of debugging and compiling system 205 may comprise confidential computing environment 415 and build environment 420. In embodiments, confidential computing environment 415 and build environment 420 may be physically located in the same location. In other embodiments, confidential computing environment 415 and build environment 420 may be located in different physical locations and send/receive data over a secured network.

Figure 5A:
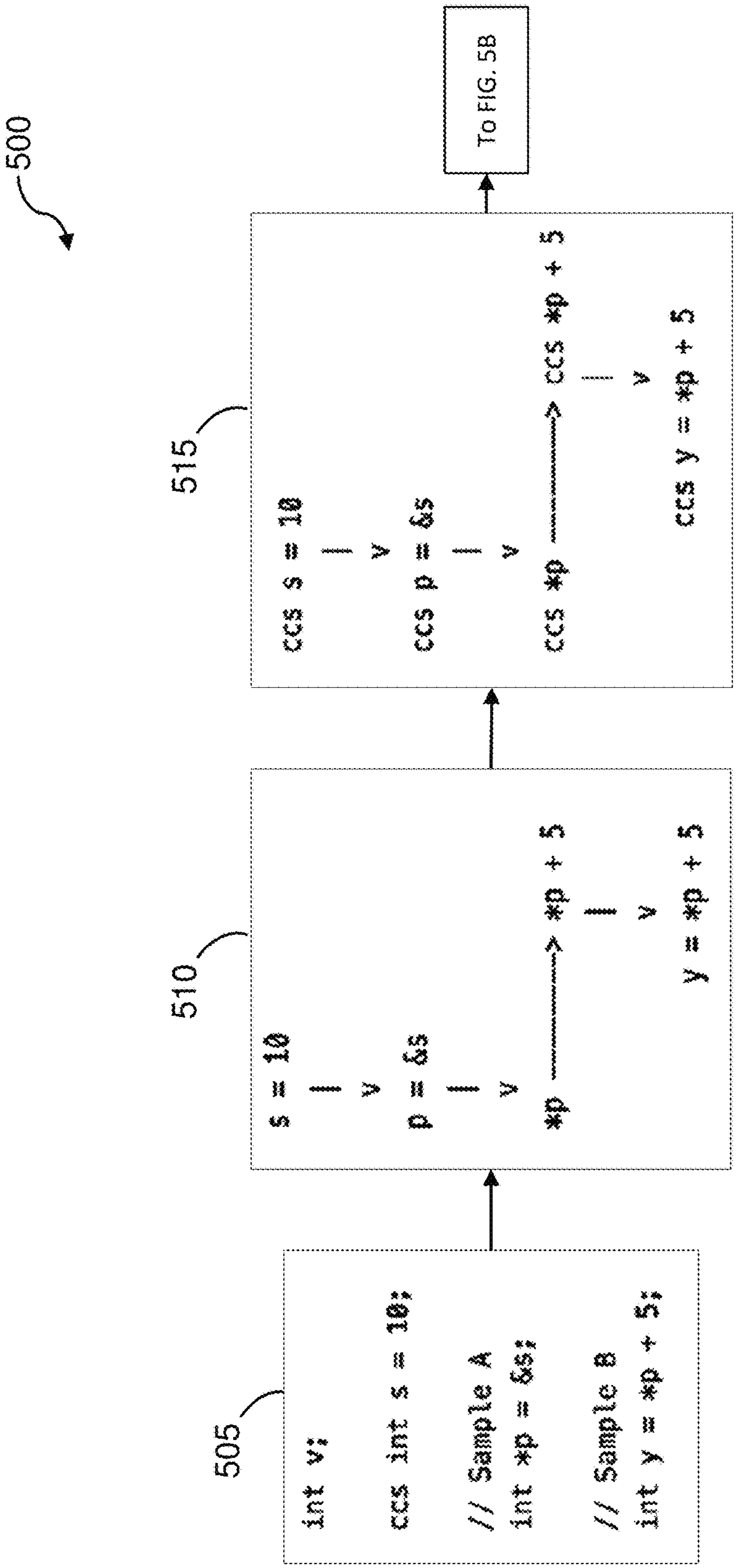
FIGS. 5A-B show a flow graph of an exemplary method in accordance with aspects of the present invention
Figure 5B:
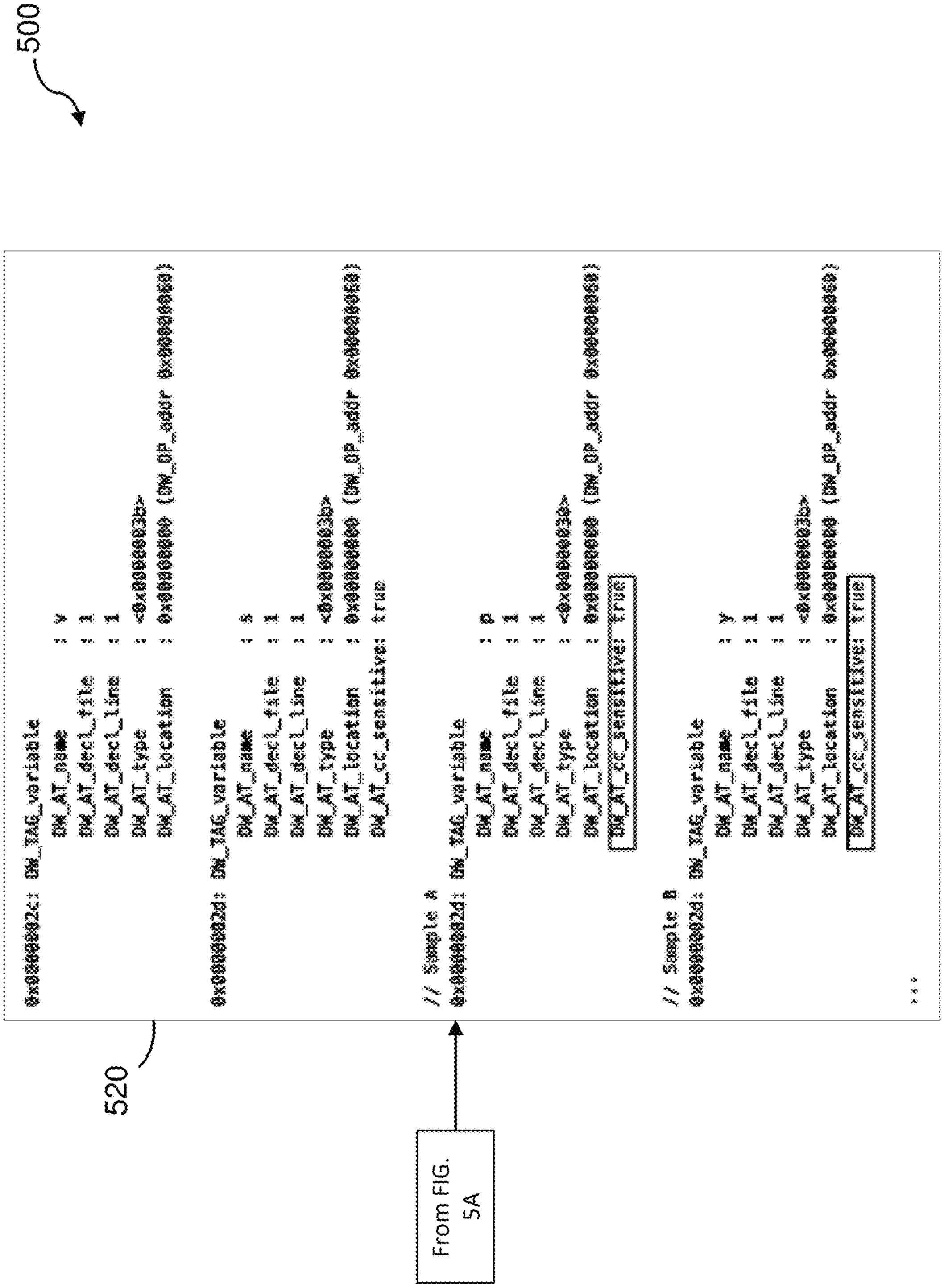

FIGS. 5A-B show a flow graph an exemplary method 500 in accordance with aspects of the present invention. Operations of the method 500 are described with reference to elements and actions depicted in and described with reference to FIGS. 2-4.

At block 505 of FIG. 5A, four variables are declared and/or initialized (e.g., v, s, p, and y). As shown, variable s is initialized using a confidential computing sensitive (ccs) tag while the other variables (e.g., v, p, and y) do not have a ccs tag. As shown, the initialization of p includes the variable s, and the initialization of y includes the variable p.

At block 510, the flow graph illustrates the relationships between each of the variables. Based on these relationships, if the value for variable p and/or variable y were known, the value for variable s could be derived, even though variable s is marked with a ccs tag. At block 515, variables p and y are updated to include a ccs tag, thereby indicating that those variables are sensitive and access to that data should be restricted. In embodiments the relationships may flow the opposite direction. For example, if variable p was marked with a ccs tag, but variable s was not marked with a ccs tag, even though variable s comes before variable p in the code, the variables are considered related, and both would be updated and/or tagged with a ccs tag.

In FIG. 5B, exemplary method 500 continues. At block 520 of FIG. 5B, the flow graph illustrates updated executable and linkable format (ELF) files for the variables. As highlighted with the white boxes, variable p (e.g., Sample A) and variable y (e.g., Sample B) include confidential computing sensitive attributes (e.g., DW_AT_cc_sensitive: true). By including confidential computing sensitive attributes, as described above with respect to operations 305-340 of FIG. 3, the system knows which variables must be safeguarded. This also enables the system to deny access to confidential computing sensitive information, thereby protecting sensitive data.

In embodiments, a service provider could offer to perform the processes described herein. In this case, the service provider can create, maintain, deploy, support, etc., the computer infrastructure that performs the process steps in accordance with aspects of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, implementations provide a computer-implemented method, via a network. In this case, a computer infrastructure, such as computer 101 of FIG. 1, can be provided and one or more systems for performing the processes in accordance with aspects of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes in accordance with aspects of the invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

identifying, by a processor set, sensitive variables marked with a confidential computing sensitive tag within a compiled microservice code;

identifying, by the processor set, unmarked variables related to the sensitive variables within the compiled microservice code;

tagging, by the processor set, the unmarked variables related to the sensitive variables with a sensitive attribute;

generating, by the processor set, debugging information entries comprising the sensitive variables and the sensitive attribute tag of the tagged unmarked variables;

generating, by the processor set, a protect flag in a debugging reply packet based on the debugging information entries; and denying, by the processor set, data access to downstream debugger clients based on the protect flag.

2. The method of claim 1, further comprising allowing, by the processor set, data access to downstream debugger clients based on an absence of a protect flag.

3. The method of claim 1, further comprising receiving, by the processor set, the compiled microservice code from a compiler, wherein the downstream debugger clients are downstream of the compiler.

4. The method of claim 1, further comprising generating, by the processor set, a data flow graph comprising a flow of data between variables and operations based on the microservice code.

5. The method of claim 4, wherein the data flow graph comprises relationship and dependency information between the variables and the operations based on the microservice code.

6. The method of claim 1, wherein the identifying unmarked variables related to the sensitive variables comprises parsing the compiled microservice code to determine that a declaration statement of the unmarked variable includes a sensitive variable of the sensitive variables marked with the confidential computing sensitive tag.

7. The method of claim 1, wherein the debugging information entries comprise organized collections of data embedded within debugging information of an executable file, wherein the debugging information entries define variables and functions.

8. A computer program product comprising:

one or more computer-readable storage media; and program instructions stored on the one or more computer-readable storage media to perform operations comprising:

identifying sensitive variables marked with a confidential computing sensitive tag within a compiled microservice code;

identifying unmarked variables related to the sensitive variables within the compiled microservice code;

tagging the unmarked variables related to the sensitive variables with a sensitive attribute;

generating debugging information entries comprising the sensitive variables and the sensitive attribute tag of the tagged unmarked variables;

generating a protect flag in a debugging reply packet based on the debugging information entries; and denying data access to downstream debugger clients based on the protect flag.

9. The computer program product of claim 8, wherein the operations further comprise allowing data access to downstream debugger clients based on an absence of a protect flag.

10. The computer program product of claim 8, wherein the operations further comprise receiving the compiled microservice code from a compiler, wherein the downstream debugger clients are downstream of the compiler.

11. The computer program product of claim 8, wherein the operations further comprise generating a data flow graph comprising a flow of data between variables and operations based on the microservice code.

12. The computer program product of claim 11, wherein the data flow graph comprises relationship and dependency information between the variables and the operations based on the microservice code.

13. The computer program product of claim 8, wherein the identifying unmarked variables related to the sensitive variables comprises parsing the compiled microservice code to determine that a declaration statement of the unmarked variable includes a sensitive variable of the sensitive variables marked with the confidential computing sensitive tag.

14. The computer program product of claim 8, wherein the debugging information entries comprise organized collections of data embedded within debugging information of an executable file, wherein the debugging information entries define variables and functions.

15. A computer system comprising:
a processor set;
one or more computer-readable storage media; and
program instructions stored on the one or more computer-readable storage media to cause the processor set to perform operations comprising:
identifying sensitive variables marked with a confidential computing sensitive tag within a compiled microservice code;
identifying unmarked variables related to the sensitive variables within the compiled microservice code;
tagging the unmarked variables related to the sensitive variables with a sensitive attribute;
generating debugging information entries comprising the sensitive variables and the sensitive attribute tag of the tagged unmarked variables;
generating a protect flag in a debugging reply packet based on the debugging information entries; and
denying data access to downstream debugger clients based on the protect flag.

16. The computer system of claim 15, wherein the operations further comprise allowing data access to downstream debugger clients based on an absence of a protect flag.

17. The computer system of claim 15, wherein the operations further comprise receiving the compiled microservice code from a compiler, wherein the downstream debugger clients are downstream of the compiler.

18. The computer system of claim 15, wherein the operations further comprise generating a data flow graph comprising a flow of data between variables and operations based on the microservice code, and wherein the data flow graph comprises relationship and dependency information between the variables and the operations based on the microservice code.

19. The computer system of claim 15, wherein the identifying unmarked variables related to the sensitive variables comprises parsing the compiled microservice code to determine that a declaration statement of the unmarked variable includes a sensitive variable of the sensitive variables marked with the confidential computing sensitive tag.

20. The computer system of claim 15, wherein the debugging information entries comprise organized collections of data embedded within debugging information of an executable file, wherein the debugging information entries define variables and functions.

* * * * *